H. L. PITMAN.
MOTION CONTROLLING DEVICE.
APPLICATION FILED MAR. 23, 1918.

1,318,916.

Patented Oct. 14, 1919.
2 SHEETS—SHEET 1.

Henry L. Pitman Inventor:

H. L. PITMAN.
MOTION CONTROLLING DEVICE.
APPLICATION FILED MAR. 23, 1918.

1,318,916.

Patented Oct. 14, 1919.
2 SHEETS—SHEET 2.

Henry L. Pitman Inventor:

UNITED STATES PATENT OFFICE.

HENRY L. PITMAN, OF BROOKLYN, NEW YORK.

MOTION-CONTROLLING DEVICE.

1,318,916.            Specification of Letters Patent.      Patented Oct. 14, 1919.

Application filed March 23, 1918. Serial No. 224,123.

*To all whom it may concern:*

Be it known that I, HENRY L. PITMAN, a citizen of the United States, residing in Brooklyn borough, city of New York, in the county of Kings and State of New York, have invented certain new and useful Improvements in Motion-Controlling Devices, of which the following is a specification.

This invention relates to new and useful improvements in speed-governing and stopping mechanism adapted for use with motors of small machines, and more particularly with motors of sound-reproducing machines.

One of the features of the present invention is the provision of a simple and inexpensive speed-governing and stopping mechanism. The various parts of my improved mechanism are so arranged as to be easily manufactured and assembled. The parts are also arranged so as to protect the mechanism, with which they coöperate, against damage and wear, due to the sudden starting and stopping of the machine.

In sound-reproducing machines, as well as in other small machines, it is essential that the parts operate practically without noise or vibration. The speed governor and its train of mechanism naturally produce some noise and vibration, and, consequently, to prevent transmission of the same to the outside of the machine, it is advantageous to provide a gear composed of soft material (usually fiber) in the train of mechanism leading from the speed governor, preferably as close to the speed governor as practical.

It is extremely convenient and desirable, in this type of machine, to utilize the brake-wheel of the speed governor as the medium through which the mechanism is stopped, because of the fact of the high gearing between the brake-wheel and the motor, and for other reasons. It is ordinarily impractical to do this, however, because the shock, accompanying the sudden arrest of the brake-wheel, causes considerable wear on the soft gear of the mechanism, which in a short time, becomes useless.

The present invention has made it possible to utilize the brake-wheel of the governor in bringing the machine to a stop, and at the same time permitting the use of a soft non-conductor of sound and vibration in the train of mechanism, thus obtaining a much sought for combination of advantages.

The present invention further improves the motor-controlling device by preventing the sudden shock on the parts, including the soft gear, when the parts are brought to an abrupt stop by other means than the brake-wheel; for instance, when the operator's hand is accidentally placed upon the turn-table, while the turn-table is in motion.

My improved speed governing and stop mechanism have other advantageous features, which will hereinafter appear.

In the accompanying drawings.

Figure 1:
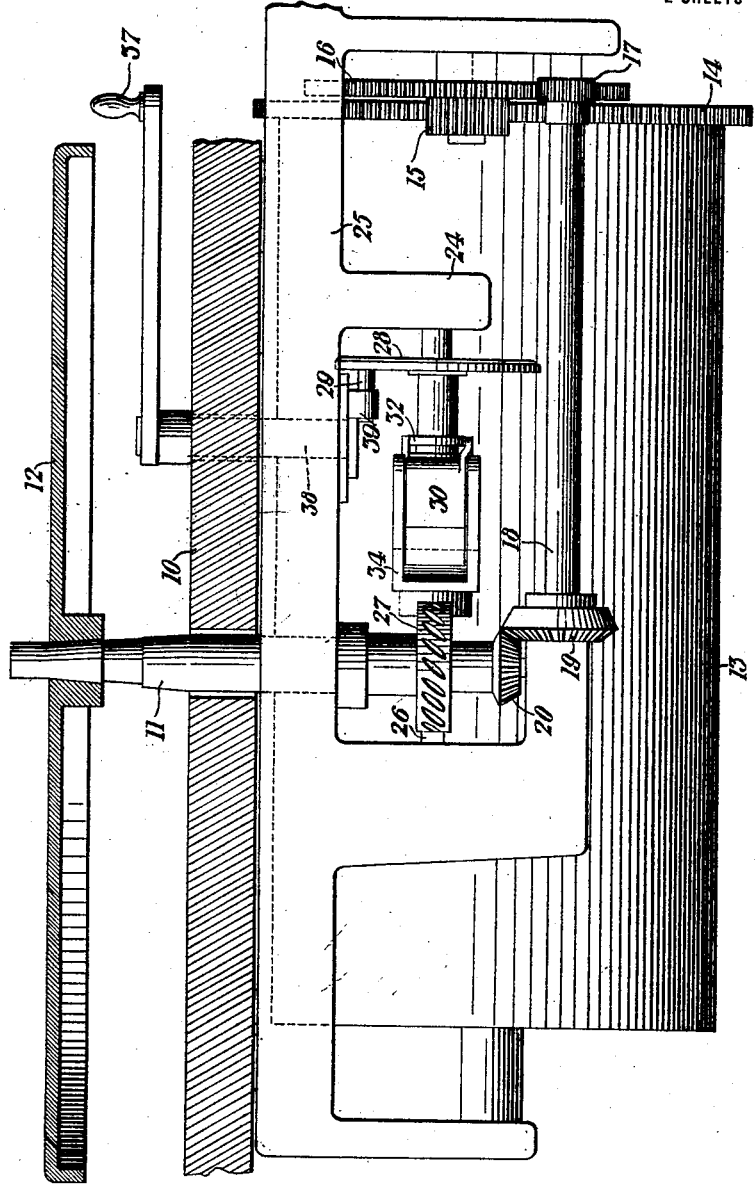
Figure 1 is a front elevation of a portion of a sound-reproducing machine, showing the motor, governor, turn-table and other parts relating to my invention.
Figure 2:
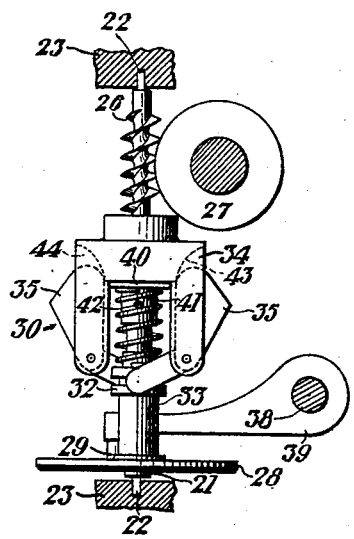
Fig. 2 is a view of the governor of my invention, with the parts in normal position.
Figure 3:
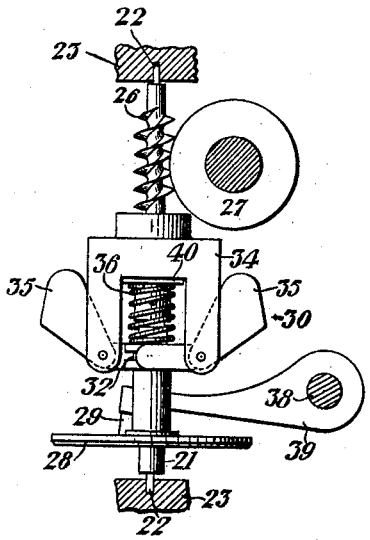
Fig. 3 is a view of the parts shown in Fig. 2, showing the operation of the parts.
Figure 4:
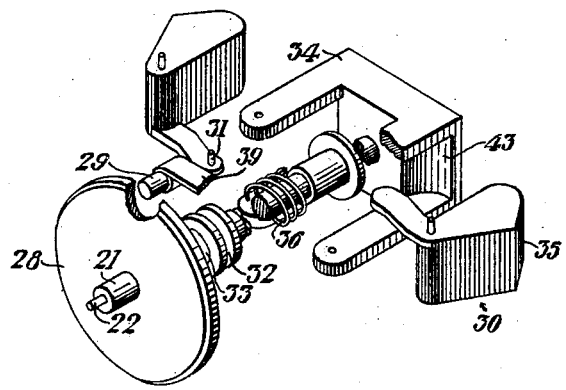
Fig. 4 is a disassembled, perspective view of the parts shown in Fig. 2.

My invention is herein illustrated as embodied in a talking-machine. In this machine the motor and other parts are contained in a casing comprising a top-board 10. A shaft 11, protrudes through the top-board and has mounted thereon a turn-table 12, by which the records are carried.

To rotate the turn-table 12, a spring motor 13 is provided with a train of gearing comprising a gear 14 secured to the motor, which meshes with a small gear 15, secured to a large gear 16, which in turn meshes with a small gear 17, secured to a shaft 18 having a bevel gear 19 which meshes with a bevel gear 20 secured to the turn-table shaft 11.

The speed at which the motor may drive the turn-table 12 is determined by my improved speed-controlling mechanism which comprises, as herein illustrated, in part, a main shaft 21 having reduced ends 22 which are mounted in bearings 23 secured to brackets 24 of the main motor frame 25. This shaft 21 is provided with a worm 26 which is driven by a worm gear 27 secured to the shaft 11 carrying the turn-table. The rotation of the shaft 21, and consequently, the rotation of the other parts, is retarded by a brake-wheel 28 which is arranged to contact with a buffer 29 when the turn-table attains the proper speed for playing the record carried thereby. The movement of the brake-wheel 28 toward the buffer 29 is controlled by levers 30, which are provided with pins 31 extending into an annular groove 32 formed in a sleeve 33 secured to the brake-wheel 28. The levers 30 are pivoted in a block 34 carried by the governor shaft 21, and are provided with weighted ends 35 which are thrown outwardly by centrifugal force when the block 34 is rotated by the shaft 21. This outward movement of the weighted levers 30 causes the brake-wheel to move toward the buffer 29, against the tension of a coiled spring 36. When the parts have attained the proper speed, the brake wheel 28 contacts with the buffer 29 and is retarded by frictional engagement therewith sufficiently to prevent the parts from rotating at any speed greater than that desired. Because of the fact that the brake-wheel 28 is geared to rotate at a much greater speed than the motor and the turn-table, the slightest friction produced by the buffer on the brake-wheel is sufficient to retard the action of the motor upon the turn-table. The buffer 29 is manually movable by means of a finger-piece 37, secured to a shaft 38 carrying the buffer arm 39.

In consequence of the high speed at which it is driven, a governor causes considerable noise and vibration; and as noise and vibration are decremental in small machines, particularly in sound-reproducing machines, it is necessary to prevent the noise and vibrations from being conducted to the outside of the machine. In part, this is accomplished by providing a soft non-conductor of sound and vibration in the train of mechanism between the governor and the turn-table 12. Preferably, this non-conducting element is placed as near the governor as practical. In the present invention this is accomplished by forming the worm gear 27, which meshes with the worm 26 secured to the governor shaft 21, of fiber. This not only prevents transmission of the noise and vibration of the governor itself, but also makes the operation of the worm noiseless.

It is convenient and advantageous in this type of machine to utilize the brake-wheel 28 and buffer 29 in bringing the machine to a dead stop, not only because of the nature of the gearing between the brake-wheel and the motor and turn-table, but also because, if thus arranged, the number of parts to be manipulated by the operator is reduced. For instance, the finger-piece 37, in addition to being capable of varying the speed of the machine, may also be used for stopping the machine. Ordinarily, it is impractical to do this because of the fact that the more or less sudden stopping of the brake-wheel causes the soft gear 27 to become damaged, due to the momentum of the turn-table 12 and other parts connected therewith, including part of the governor. To do this, I arrange the governor parts in such relation to one another that the momentum of the parts may be gradually, although quickly, spent after the brake-wheel 28 is stopped by the buffer 29. Accordingly, I mount the brake-wheel 28 upon the shaft 21, so that said shaft 21 may rotate independently of the brake-wheel at certain times, instead of splining the brake-wheel to the governor shaft, as is usually the practice. Under ordinary circumstances, the brake-wheel, in the present invention, is driven by a frictional and yieldingly driving connection to the shaft 21. To produce this friction between the shaft 21 and the brake-wheel 28, the coil spring 36, which is normally compressed and which bears at one end against the sleeve 33 of the brake-wheel, is arranged to bear at its other end against a flange 40 formed integral with a collar 41 secured to the shaft 21 by a screw 42. This spring 36, being normally compressed, tends to turn with the shaft 41 because of its frictional engagement with the flange 40, and, consequently, tends to turn the brake-wheel because of its frictional engagement with the sleeve 33 thereof.

It will be noted that the brake-wheel 28 tends to move along the shaft 21, under the influence of the spring 36; but any such movement of the brake-wheel past normal position, is prevented by the weight arms 30 which are connected to the brake-wheel and which normally rest against the inner surface 43 of a groove 44 in the block 34 in which the weights 35 normally lie.

When the machine is stopped by means of the buffer and brake-wheel, the brake-wheel is suddenly arrested in its rotation, but this sudden stopping of the brake-wheel does not simultaneously arrest all the parts of the machine, because of the fact that the spring 36 may yield and permit the other parts to continue to rotate. The spring 36 does not permit this independent rotation of the parts to be prolonged, however, for any considerable length of time, because the spring, constantly tending to retard the speed of the part, causes the momentum thereof to be gradually, yet quickly spent. This gradual reduction of the speed of the part, of course, does not work injury upon the soft fiber gear but instead makes its practical use possible.

My improved governor is also arranged to protect the fiber gear 27 and itself against sudden shocks acompanying the arrest of certain parts when the parts are arrested by means other than the buffer and brake-wheel. This is done by providing for frictional driving connection between the weight members, including the block 34, and the weighted arm 30 and the governor shaft 21.

Instead of positively connecting the weight member to the shaft 21, to be positively rotated thereby, as has heretofore been the practice, I loosely mount said members on said shaft and cause the block 34 to frictionally engage the flange 40 which is secured to the shaft 21. This frictional engagement of the block 34 with the flange 40 is sufficient to cause said block to rotate with the shaft 21 under ordinary conditions. This frictional drive is produced by the spring 36. This spring, as before stated, bears at one end against the flange 40, and at the other end against the sleeve 33 of the brake-wheel, and tends to move said brake-wheel along said shaft, but is prevented therefrom by the contact of the weight end 35 of the arm 30 with the block 34. Consequently, the pressure of the spring 36, through the brake-wheel 28 and the weighted arm 30, tends to move the block 34 longitudinally of the shaft 21. The flange 40 is so arranged on the shaft 21 as to prevent this longitudinal movement of the block 34, and therefore the block 34 is caused to engage the flange 40, under the influence of the spring 36. The friction caused by this engagement of the block 34 with the flange 40 is sufficient to cause the block to rotate with the governor shaft under ordinary circumstances.

When, however, the shaft 21 is suddenly stopped, as would be the case if the operative's hand is placed upon the turn table, the block 34 and the weighted levers 30 are permitted to continue to rotate. This independent movement of the block 34 and weighted levers 30 is permitted to continue until the momentum of the same is spent. This independent movement of the weight members 30 and 34 is permitted by the spring 36 which is not sufficiently powerful to instantaneously overcome the momentum of the block 34 and weight levers 30. The weight members 30 and 34, are, however, gradually retarded and finally stopped by the spring 36 which constantly urges the block 34 against the flange 40. It will be noted that the spring 36 is compressed as the speed at which the parts rotate increases, consequently increasing the friction between the block 34 and the flange 40. This in no way changes the operation of the device, but instead causes the speed of the weighted levers to be decreased at the same rate, whether the machine is traveling at high or low speed, because of the fact that the spring has a more powerful retarding action when compressed by the high speed of the parts which compensates for the increase in the momentum of the parts.

From the foregoing it will be seen that if the train of mechanism, including the soft gear 27, is abruptly stopped, the weighted arms 35 and the block 34 slip on the shaft 21 and therefore do not produce a sudden jerk or jolt which would damage the soft gear 27 and produce considerable wear and tear upon the governor mechanism itself.

Variations may be resorted to within the scope of the invention, and portions of the improvements may be used without others.

Having thus described my invention, I claim:

1. In a motion-controlling device, the combination with a brake-wheel, of weighted members controlling said brake-wheel, and a yielding driving connection between said brake-wheel and said weighted members, whereby either may rotate independently of a corresponding movement of the other.

2. In a motion-controlling device, the combination with a governor shaft, of weighted members, a support for said weighted members loosely mounted on said shaft, a collar on said shaft loosely confining said support against lateral movement on said shaft in one direction, a sleeve on said shaft connected to the weight support, and a spring between said collar and said sleeve, the tension of the spring being sufficient to cause the weight support to bear against said confining collar with enough pressure to cause said collar to frictionally drive said weight support under ordinary circumstances.

3. In a motion-controlling device, the combination with a governor shaft, of weighted levers, a support in which said weighted levers are pivotally mounted, said support being loosely mounted on said shaft, a collar fixed to the latter, a brake-wheel mounted on said shaft, and a spring interposed between said collar and wheel and against the tension of which the weighted arms may move about their pivots, and the brake-wheel move along said shaft, said spring also being arranged to cause said weight support to be frictionally driven by said governor shaft.

4. In a motion controlling device, the combination with a governor shaft, a block mounted loosely thereon, weighted members pivotally mounted upon said block, a brake wheel loosely journaled upon the shaft and having a sleeve which has pivotal connection with said weighted members, a spring bearing against said sleeve and tending to cause the block to rotate frictionally with the shaft.

5. In a motion controlling device, the combination with a governor shaft, a brake wheel journaled thereon and provided with an integral sleeve, having a circumferential groove formed therein, a block journaled loosely upon the shaft, and having oppositely disposed recesses, weighted members pivoted within the latter and having pivotal connection with the groove of said sleeve, a collar fixed to the shaft and provided with a flange, a spring interposed between said flange and sleeve and coöperating with said collar and block to cause the latter to rotate with the shaft.

6. In a motion controlling device, the combination with a governor shaft, a brake wheel journaled thereon, and having an integral sleeve with an annular groove in its circumference, a block loosely mounted upon the shaft and having recesses in the opposite edges thereof, weighted members pivotally mounted within said recesses, and having pivotal projections engaging the annular groove in said sleeve, a collar fixed to the shaft, and having a flange against which the block is adapted to have frictional contact, a spring upon the shaft interposed between said flange and sleeve.

HENRY L. PITMAN.

Copies of this patent may be obtained for five cents each, by addressing the "Commissioner of Patents, Washington, D. C."